United States Patent [19]

Britts, II et al.

[11] Patent Number: 4,689,061
[45] Date of Patent: Aug. 25, 1987

[54] METHOD AND APPARATUS FOR PRODUCING FINE FIBERS

[75] Inventors: William C. Britts, II, Gahanna; Farrokh Kaveh, Columbus; David C. K. Lin, Newark, all of Ohio

[73] Assignee: Owens-Corning Fiberglas Corporation, Toledo, Ohio

[21] Appl. No.: 865,211

[22] Filed: May 20, 1986

[51] Int. Cl.⁴ .......................................... C03B 37/04
[52] U.S. Cl. .............................................. 65/6; 65/14
[58] Field of Search ................ 65/6, 8, 14, 15; 425/8, 425/9; 264/8

[56] References Cited

U.S. PATENT DOCUMENTS

| 355,138 | 12/1886 | Cairns et al. | 425/8 X |
| 3,070,045 | 12/1962 | Bowe | 425/9 |
| 3,250,602 | 5/1966 | Stalego | 65/8 |
| 3,304,164 | 2/1967 | Charpentier et al. | 65/14 |
| 3,644,108 | 2/1972 | Russell | 65/8 |
| 4,203,774 | 5/1980 | Battigelli et al. | 65/2 X |

Primary Examiner—Robert L. Lindsay
Attorney, Agent, or Firm—Ronald C. Hudgens; Greg Dziegielewski; Ted C. Gillespie

[57] ABSTRACT

A method and apparatus for making glass fibers comprises a burner creating an annular jet of high-temperature, high-velocity gases and an orificed spinner mounted for rotation within the jet where the circumferential rows of orifices on the spinner peripheral wall are grouped in bands, with the bands being spaced apart by blank areas on a spinner peripheral wall, and the orifices increasing in size from the bottom band to the top band.

15 Claims, 3 Drawing Figures

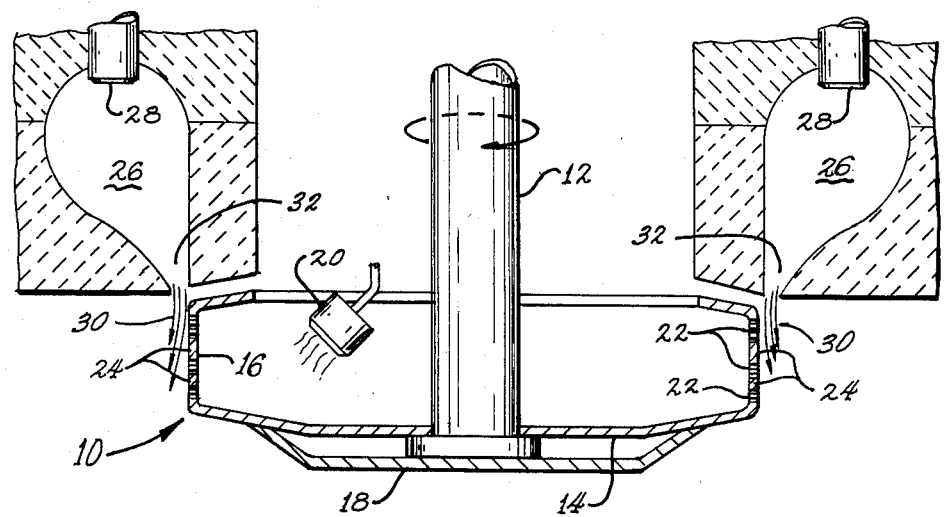
FIG. 1
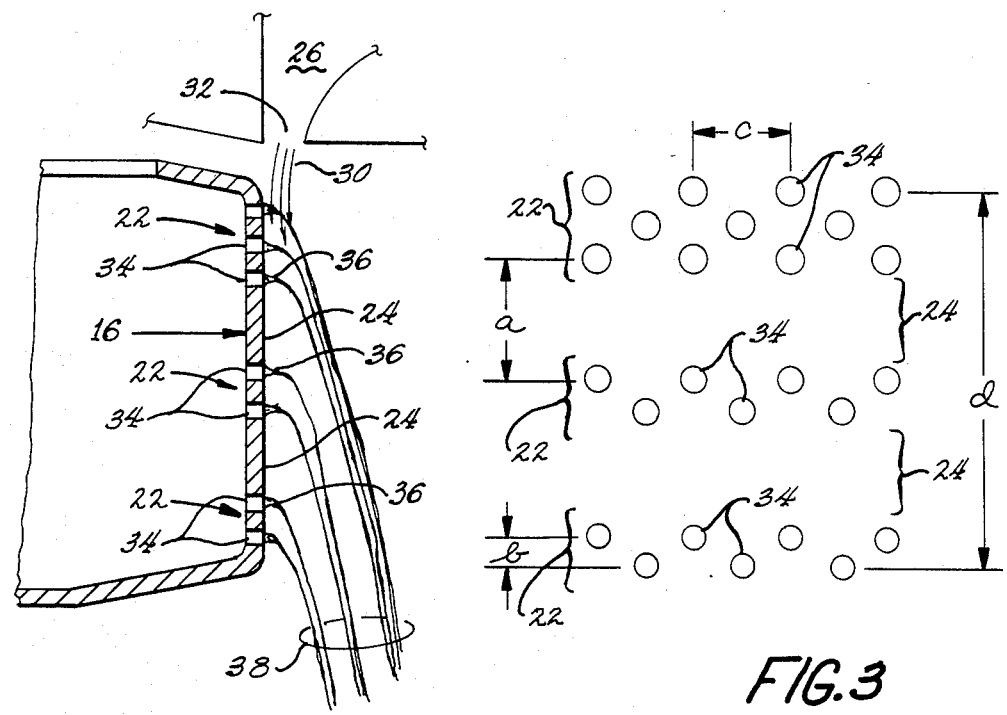
FIG. 2
FIG. 3

METHOD AND APPARATUS FOR PRODUCING FINE FIBERS

TECHNICAL FIELD

This invention relates to the production of mineral fibers and mineral fiber products. More specifically, this invention relates to producing fine mineral fibers, including glass fibers, by the rotary process.

BACKGROUND OF THE INVENTION

A common practice in forming fibers of mineral material, such as glass fibers, is to pass the material in the molten state through the orifices of the peripheral wall of a centrifuge or spinner to create primary streams of molten glass. Thereafter, the primary streams are further attenuated into glass fibers of smaller diameter by the action of a flow of gases ddischarged downwardly in an annular jet positioned circumferentially of the spinner. Some fiber forming processes, such as the Supertel process, use an annular combustion chamber burner positioned around the spinner to produce a "flame" or gasses of combustion resulting in a high-velocity, high-temperature gaseous jet passing across the face of the spinner.

The pirmary streams of molten glass emanate from numerous rows of orifices in the spinner peripheral wall. Typically, in the production of glass fibers for insulation products or structural products, the orifices are closely packed on the spinner peripheral wall, numbering 10,000 or more orifices per spinner. The close spacing of the orifices in the spinner peripheral wall results in bumping and interference among the primary streams and glass fibers during the formation of the glass fibers. There is little or no effect on the ultimate insulation or structural products, however, because these fibers are thick enough to withstand the contact without deterioration. These insulation products typically have fiber diameters ranging from 4 to 8 microns for insulation products, while structural products such as molding media and pipe insulation material have fiber diameters ranging from 5 to 15 microns.

When the rotary process is used to produce smaller diameter staple or chopped fibers for such critical uses as the production of wet process mats, it has been found that fiber interference during fiber forming greatly impairs the strength of the individual fibers. This results in ultimate products (e.g., reinforcing mats made from discrete length glass fibers) having unacceptably low strength. In order to increase the strength of the rotary chopped fibers to be used as input for wet process mats, it is necessary to minimize or eliminate fiber interference during fiber forming. Also, steps taken to minimize fiber interference must be done with a view toward economics, which require certain throughput levels per spinner for economic efficiency. Although the possibility exists of making high-strength rotary fine fibers using a single row of holes, this could not be considered an economical process.

One method proposed in the past for eliminating fiber interference in the rotary process is that disclosed by Charpentier et al. and U.S. Pat. No. 3,304,164. The method disclosed is to provide the spinner with orifices of greater diameter in the upper rows and orifices of lesser diameter in the lower rows. The primary streams issuing from the upper part of the spinner are thicker and have a greater mass flow rate and are therefore deflected less by the jet from the annular combustion chamber burner. Charpentier et al. teach that the result of the gradient of orifice diameters is less fiber interference, resulting in greater tensile strengths for the glass fibers.

The teaching of Charpentier et al. breaks down when applied to a process for making fine fibers having diameters smaller than about 3 microns. These fine fibers are more likely to be used for making glass fiber mats which require tensile strengths. Throughput per hole is so low that under normal production conditions any minor upset in the production process translates to significant deterioration of fiber tensile strength. This happens because of maldistribution of throughput across the face of the spinner, giving rise to interference of lower fibers with the upper ones. Accordingly, due to the difficulty of maintaining a stable production process and the extreme sensitivity of fine fiber tensile strength to defects caused by interference, production of fibers in the desirable diameter range $\frac{1}{2}$-3 microns) is very difficult, especially at commercially acceptable throughputs.

STATEMENT OF THE INVENTION

There has now been developed a method and apparatus for producing fine fibers which overcomes the previous production problems for making fine fibers from the rotary process. The rows of orifices in the spinner are grouped into bans which are separated by blank spaces or blank areas on the spinner peripheral wall. The primary streams emanating from the bands do not interfere with the primary streams from adjacent bands, and therefore the resulting glass fibers have significantly increased tensile strength.

According to this invention, there is provided apparatus for making glass fibers comprising a burner for creating an annular jet of high-temperature, high-velocity gases, an orificed spinner mounted for rotation within the jet to create primary streams of molten glass which are turned downward and further attenuated into glass fibers by the jet, the circumferential rows of orifices on the spinner peripheral wall being grouped in bands, each band having two or more rows, the band being spaced apart by blank areas on the spinner peripheral wall, and the orifices increasing in size from the bottom band to the to band to enable increasing momentum for the primary fibers from the bottom band to the top band.

In a preferred embodiment of the invention the number of orifices in the top band is greater than the number of orifices in any other band.

In another preferred embodiment of the invention the number of rows in the top band is greater than the number of rows in any other band.

In another preferred embodiment of the invention the ratio of (a) the sum of the diameters of all the orifices in any given band, to (b) the circumference of the jet where the primary streams intersect the jet, is within the range of from about 0.75 to about 1.10.

Most preferably the ratio is within the range of from about 0.85 to about 0.95.

In another preferred embodiment of the invention the ratio of the average spacing between bands to the average spacing between rows within the bands is within the range of from about 1.7 to about 2.7.

In yet another preferred embodiment of the invention the deflection of the streams from any given band caused by the jet is greater than the deflection of the streams produced from any higher band.

According to this invention, there is also provided a method for making glass fibers comprising rotating an orificed spinner to centrifuge molten glass into primary streams of molten glass, the circumferential rows of orifices on the spinner peripheral wall being grouped in bands, each band having two or more rows, the band being spaced apart by blank areas on the spinner peripheral wall so that the primary streams centrifuged from each band are separated from the primary streams from any other band, and the orifices increasing in size from the bottom band to the top band so that the primary streams centrifuged from any band have greater momentum that the momentum of the primary streams from any lower band, and intersecting the primary streams with an annular jet of high-temperature, high-velocity gases positioned around the spinner to further attenuate the primary streams into glass fibers.

DESCRIPTION OF THE DRAWINGS

FIG. 1 is a schematic cross-sectional view in elevation of apparatus for forming glass fibers according to the principles of the invention.

FIG. 2 is a schematic cross-sectional view in elevation showing greater detail of the spinner peripheral wall of FIG. 1.

FIG. 3 is a view in elevation of the orifice pattern of a section of the peripheral wall of the spinner in FIG. 1.

DESCRIPTION OF THE INVENTION

The description will be described in terms of a glass fiber forming operation, although it is to be understood that the invention can br practiced using other heat-softenable mineral material, such as rock slag and basalt.

As shown in FIG. 1, spinner 10 is mounted for rotation on quill 12 to cause molten glass (not shown in FIG. 1) to flow across spinner bottom wall 14 and through the orificed peripheral wall 16 to form the fibers. The spinner bottom wall is preferably provided with insulation shield 18 and internal burner 20 to help maintain the proper glass temperature within the spinner. As shown, the spinner peripheral wall is adapted with rows of orifices which are grouped into bands 22 separated by peripheral wall blank areas 24.

Positioned circumferentially just outside the spinner peripheral wall is combustion chamber 26 fired by burner 28. The combustion chamber and burner can be of any suitable type as long as they produce a downwardly moving annular jet 30 of high-velocity, high-temperature gases from the combustion chamber throat 32. As shown, the throat is converging, and thus the velocity of the gases would probably be sonic at the throat, with subsequent rapid decay in the downward direction. The velocity of the jet might be 500 to 600 ft./sec at the bottom of the spinner. The temperature of such gases within the throat would be on the order of 3000° F., and this temperature would also decay rapidly. The temperature of the jet might be 1500°–2000° F. at the bottom of the spinner.

As shown in FIG. 2, bands 22 contain rows of orifices 34. The diameters of the orifices can be any suitable diameter for making fine fibers of less than about 3 microns. Preferably, the diameters increase from the bottom band to the top band. The primary streams 36 emanating from the orifices are met by the jet approximately ⅛ inch away from the spinner peripheral wall and are deflected downwardly by the jet. The jet further attenuates the streams which are then cooled into glass fibers 38.

As shown in FIG. 3, the orifices within rows can be spaced apart by dimension "c". The spacing between rows can be given by dimension "b". The spacing between bands is indicated by dimension "a". And, the total field of the orifices as indicated by dimension "d". Preferably, the number of orifices in the top band is greater than the number of orifices in any other band, as shown. Also, the number of rows in the top band is preferably greater than the number of rows in any other band. Also, the ratio of the average spacing between bands to the average spacing between rows within the bands (ration a/b) is preferably within the range of about 1.7 to about 2.7, and most preferably about 2.0.

When all of the diameters of all of the orifices in any given band are added up, they should not be much greater than the circumference of the jet where the primary streams from that band intersect the jet. Otherwise the fibers will interfere with each other, causing degradation of tensile strength. Preferably, the sum of the diameters is within the range of from about 0.75 to about 1.10 of the circumference of the jet, and most preferably within the range of from about 0.85 to about 0.95.

It is believed that the invention enables the production of fine fibers without fiber interference because the deflection of the primary streams occurs to a greater and greater extent as the jet passes downward past the lower and lower rows or orifices. The primary streams emanating from the top rows of greater diameter have greater mass or throughput and thus are harder to deflect. The annular jet applies a greater deflection force to the top primary streams, relative to the lower primary streams, since it decays as it moves downward. Taking both of these factors into consideration, the deflection can be approximated as being proportional to the inverse of the product of a vertical distance of the orifice from a reference (say, the distance below the exit of the burner) times the orifice diameter to the eighth power. In order to avoid interference, the deflection of any two rows of primary streams must be such that the higher row has a lesser deflection than the lower row. Although it would appear that the orifices need only be correctly sized in order to enable the use of closely vertically spaced rows of orifices in the spinner peripheral wall, it has been found that because of the sensitivity of the process when making fine fibers less than about 3 microns, and preferably with an average diameter of about 2 microns or less, that it is necessary to provide gaps between rows having orifices of different diameters.

EXAMPLE

A fiberizer according to the invention having an 8 inch spinner was used to produce glass fibers. In each case a handmade mat sheet of the discrete glass fibers was made according to TAPPI test number T494-os70 and the tensile strength in pounds was measured. The spinner for trial 1 was drilled with 14 rows of orifices, each being 0.024 inches in diameter. The spinner for trial 2 was drilled with 13 rows of orifices, each being 0.022 inches in diameter. Trials 3 and 4 were made with a similar 8 inch spinner having 13 rows of orifices gradually increasing upwardly from a diameter of 0.022 inches in the bottom row to 0.026 inches in the top row. Trials 5 and 6 used a similar spinner with a hole pattern according to the invention, having 3 rows or orifices with a diameter of 0.027 inches in the first band, 2 rows of orifices having a diameter of 0.024 inches in the second band and 2 rows of orifices having a diameter of 0.022 inches in the third band. The drilling pattern of the orifices in the 5th and 6th trials had the dimensions as shown in FIG. 3 where a=0.120 inches, b=0.060 inches, c=0.071 inches and d=0.480 inches. The results are given in the following table.

| Trial No. | Fiber Dia. (Microns) | Handmade Mat Sheet Tensile, Lbs. | Spinner Hole Pattern |
|---|---|---|---|
| 1 | 1.38 | 0.25 | straight .024" (14 rows) |
| 2 | 1.88 | 0.14 | straight .022" (13 rows) |
| 3 | 1.80 | 0.30 | graduated .022"-.026" (13 rows) |
| 4 | 1.33 | 0.23 | graduated .022"-.026" (13 rows) |
| 5 | 1.19 | 0.64 | banded .027" (3 rows) |
| 6 | 1.25 | 0.65 | banded .024" (2 rows) banded .022" (2 rows) |

The throughput in each case was 100 lbs. per hour per spinner. Thus, it can be seen that even the gradual increase in diameter from bottom to top of trials 3 and 4, as suggested by the prior art, was insufficient to bring tensile strengths up to a desirable level. The apparatus of the invention, however, resulted in significantly improved tensile strengths as shown by the results from trials 5 and 6.

It will be evident from the foregoing that various modifications can be made to this invention. Such, however, are considered as being within the scope of the invention.

INDUSTRIAL APPLICABILITY

This invention will be found to be useful in the production of mineral fibers and mineral fiber products, for such uses as the production of mats for reinforcing resin matrices.

We claim:

1. Apparatus for making glass fibers comprising a burner for creating an annular jet of high-temperature, high-velocity gases, an orificed spinner mounted for rotation within the jet to create primary streams of molten glass which are turned downward and further attenuated into glass fibers by the jet, the circumferential rows of orifices on the spinner peripheral wall being grouped in bands, each band having two or more rows, the bands being spaced apart by blank areas on the spinner peripheral wall, and the orifices increasing in size from the bottom band to the top band to enable increasing momentum for the primary fibers from the bottom band to the top band.

2. The apparatus of claim 1 in which the number of orifices in the top band is greater than the number of orifices in any other band.

3. The apparatus of claim 2 in which the number of rows in the top band is greater than the number of rows in any other band.

4. The apparatus of claim 1 in which the ratio of (a) the sum of the diameters of all the orifices in any given band, to (b) the circumference of the jet where the primary streams intersect the jet, is within the range of from about 0.75 to about 1.10.

5. The apparatus of claim 4 in which the ratio is within the range of from about 0.85 to about 0.95.

6. The apparatus of claim 1 in which the ratio of the average spacing between bands to the average spacing between rows within the bands is within the range of from about 1.7 to about 2.7.

7. The apparatus of claim 1 in which the deflection of the streams from any given band caused by the jet is greater than the deflection of the streams produced from any higher band.

8. A method for making glass fibers comprising rotating an orificed spinner to centrifuge molten glass into primary streams of molten glass, the circumferential rows of orifices on the spinner peripheral wall being grouped in bands, each band having two or more rows, the bands being spaced apart by blank areas on the spinner peripheral wall so that the primary streams centrifuged from each band are separated from the primary streams from any other band, and the orifices increasing in size from the bottom band to the top band so that the primary streams centrifuged from any band have greater momentum than the momentum of the primary streams from any lower band, and intersecting the primary streams with an annular jet of high-temperature, high-velocity gases positioned around the spinner to further attenuate the primary streams into glass fibers.

9. The method of claim 8 comprising separating the primary streams from the different bands to an extent sufficient to prevent interference between primary streams from one band with the primary streams from another.

10. The method of claim 9 in which the ratio of the average spacing between bands to the average spacing between rows within the bands is within the range of from about 1.7 to about 2.7.

11. The method of claim 10 in which the deflection of the primary streams of any given band caused by the jet is greater than the deflection of the streams produced from any higher band.

12. The method of claim 8 in which the number of orifices in the top band is greater than the number of orifices in any other band.

13. The method of claim 12 in which the number of rows in the top band is greater than the number of rows in in any other band.

14. The method of claim 8 in which the ratio of (a) the sum of the diameters of all the orifices in any given band, to (b) the circumference of the jet where the primary streams intersect the jet, is within the range of from about 0.75 to about 1.10.

15. The method of claim 14 in which the ratio is within the range of from about 0.85 to about 0.95.

* * * * *